July 3, 1923.

J. SHAPIRO

CONE MAKING MACHINE

Original Filed Aug. 29, 1919      5 Sheets-Sheet 1

1,460,611

Inventor:
JOSEPH SHAPIRO
BY:
his ATTORNEYS.

July 3, 1923.

J. SHAPIRO

CONE MAKING MACHINE

Original Filed Aug. 29, 1919  5 Sheets-Sheet 2

Inventor:
Joseph Shapiro
BY:
his Attorneys.

July 3, 1923.
J. SHAPIRO
CONE MAKING MACHINE
Original Filed Aug. 29, 1919  5 Sheets-Sheet 3
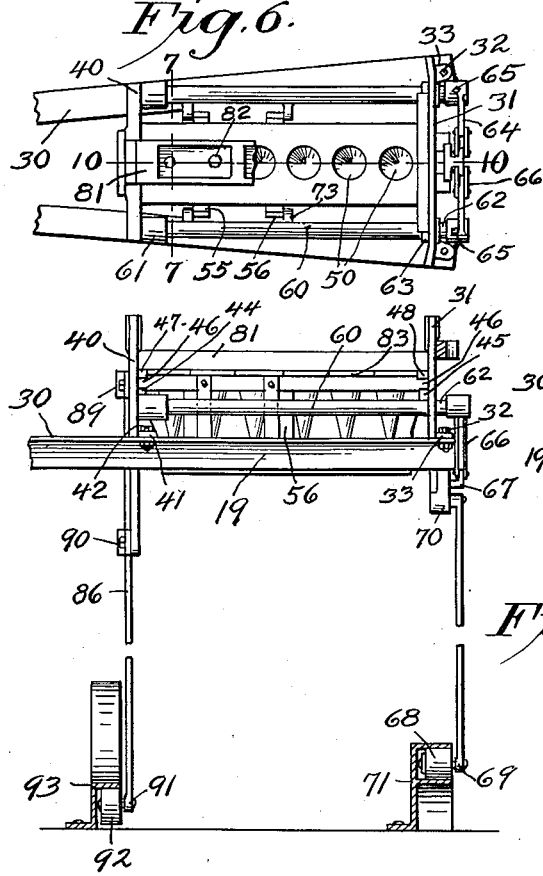
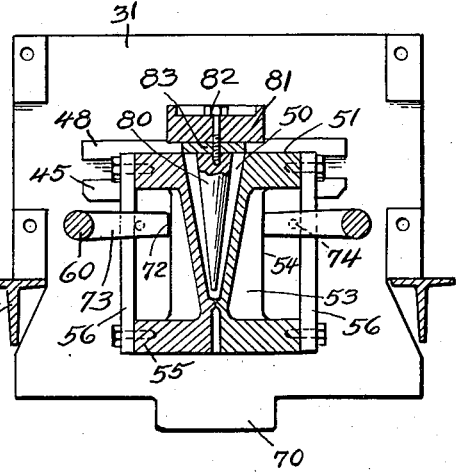
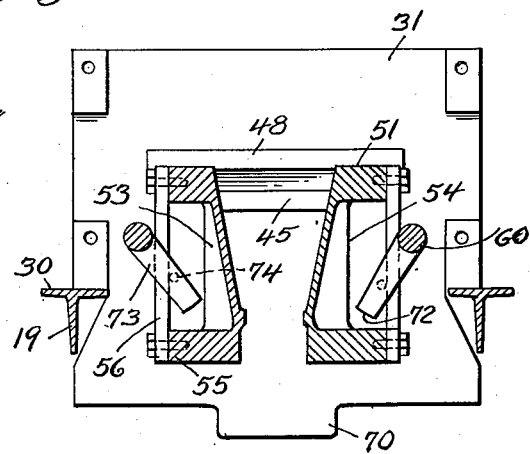
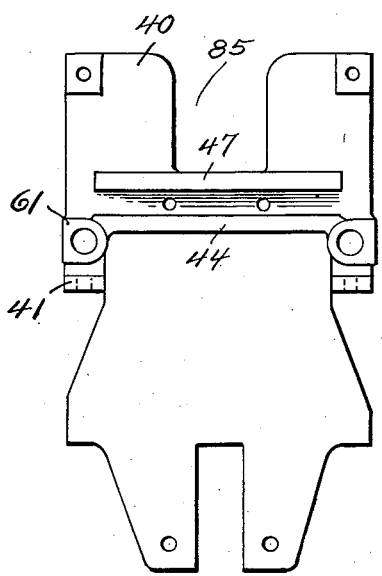
Inventor:
BY: JOSEPH SHAPIRO
his Attorneys.

July 3, 1923.
J. SHAPIRO
CONE MAKING MACHINE
Original Filed Aug. 29, 1919  5 Sheets-Sheet 4
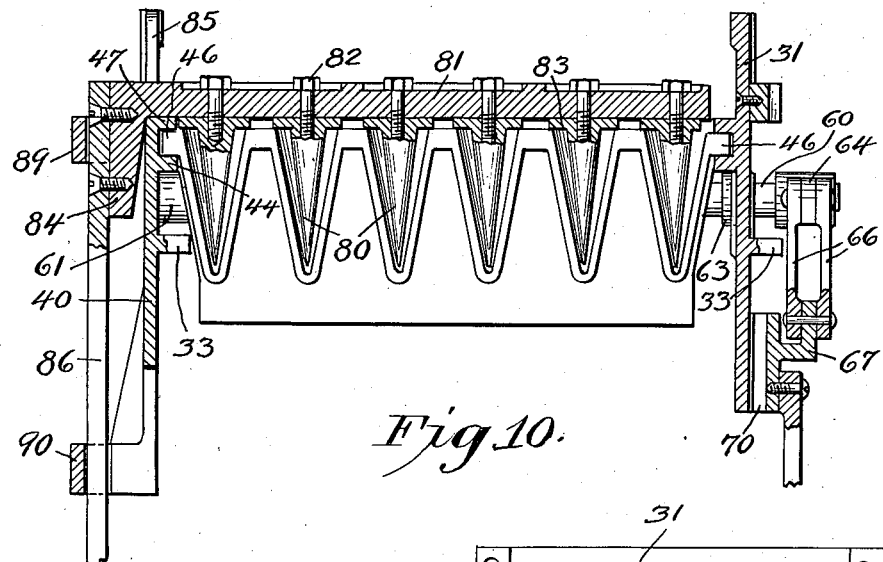
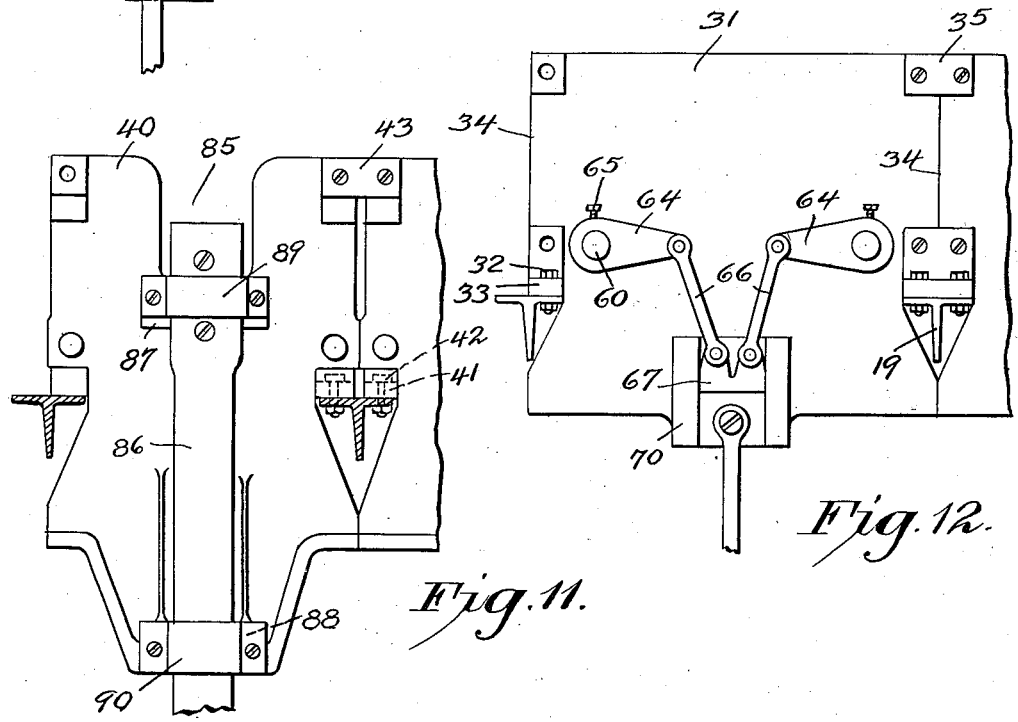
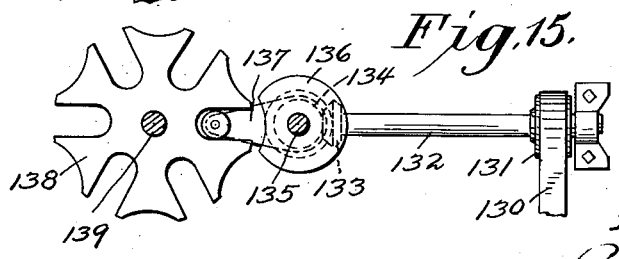
Inventor:
JOSEPH SHAPIRO

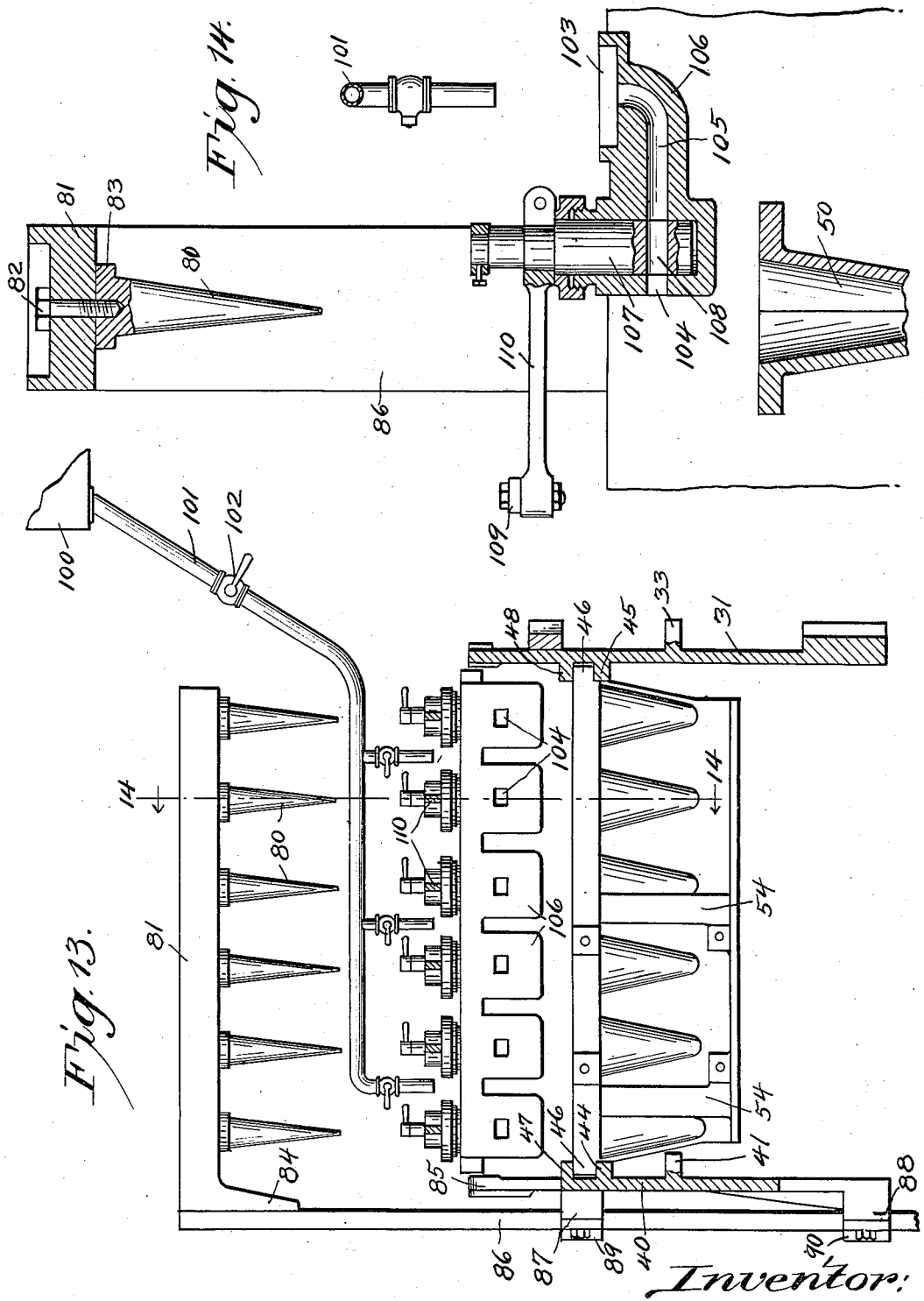

Patented July 3, 1923.

1,460,611

UNITED STATES PATENT OFFICE.

JOSEPH SHAPIRO, OF BALTIMORE, MARYLAND.

CONE-MAKING MACHINE.

Application filed August 29, 1919, Serial No. 320,620. Renewed May 18, 1923.

*To all whom it may concern:*

Be it known that I, JOSEPH SHAPIRO, a citizen of the United States, residing at Baltimore, in the State of Maryland, have invented certain new and useful Improvements in Cone-Making Machines; and I do hereby declare the following to be a full, clear, and exact description of the same, reference being had to the accompanying drawings, forming part of this specification.

This invention relates to machines for making hollow pastry cones for containing ice cream and intended to be eaten therewith.

The object of this invention is to provide a machine that will produce such cups or cones, quickly and efficiently, and at low cost. Other objects of the invention are the improvement of the various steps of feeding the batter to the molds, opening and closing of the mold sections, raising of the points above the feeding mechanism, and the heating or baking of the cones. Other objects will be apparent from the following description and the appended claims.

In the drawings,—

Fig. 5 is an elevation of the mold.

Fig. 6 is a plan of the mold.

Fig. 7 is a section on the line 7—7 of Fig. 6.

Fig. 8 is a section showing the mold open.

Fig. 9 is a view illustrating the interior of the inside head.

Fig. 10 is a section on the line 10—10 of Fig. 6.

Fig. 11 is a view illustrating the exterior of the inside head.

Fig. 12 is a view illustrating the exterior of the outside head.

Fig. 13 is a view illustrating the mold with the cores elevated to pass the dough supply valves, etc.

Fig. 14 is a section on the line 14—14 of Fig. 13.

Fig. 15 is a section on the line 15—15 of Fig. 1.

Figure 2:
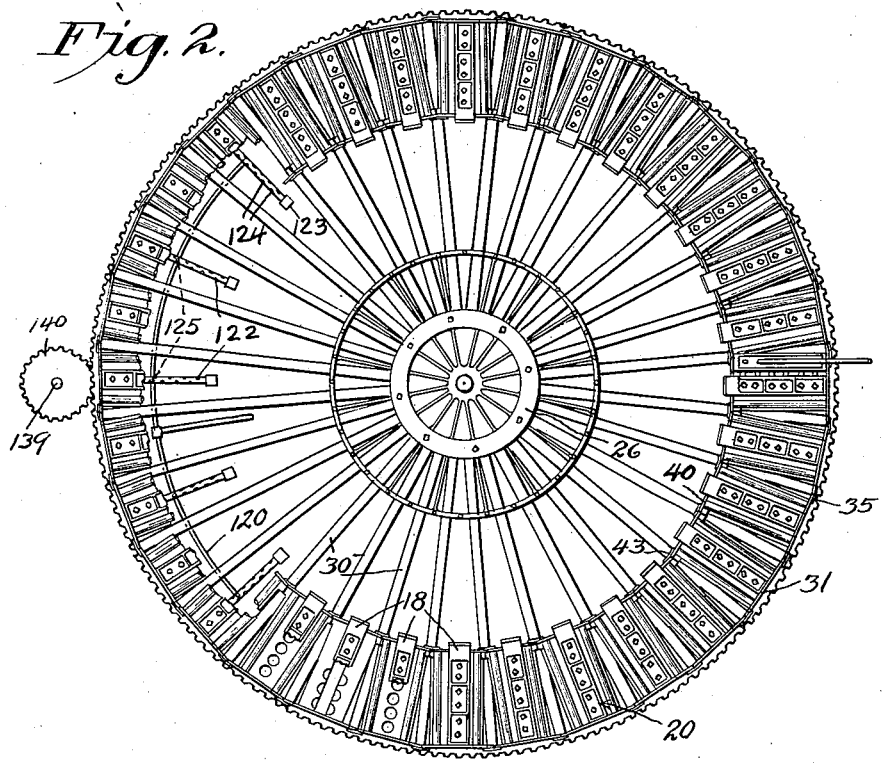
Fig. 2 is a plan view of the machine.
Figure 1:
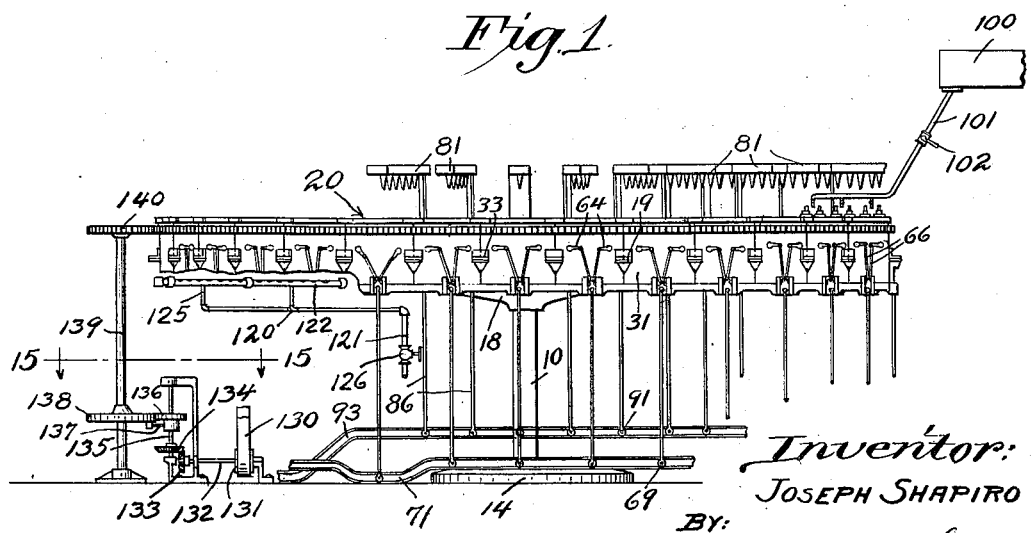
Figure 1 is an elevation of the machine.
Figure 4:
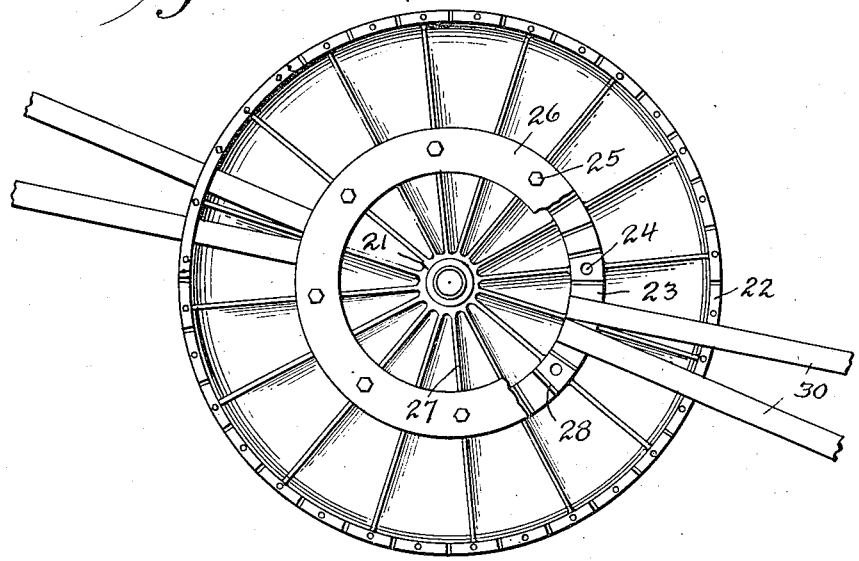
Fig. 4 is a plan of the bowl.
Figure 3:
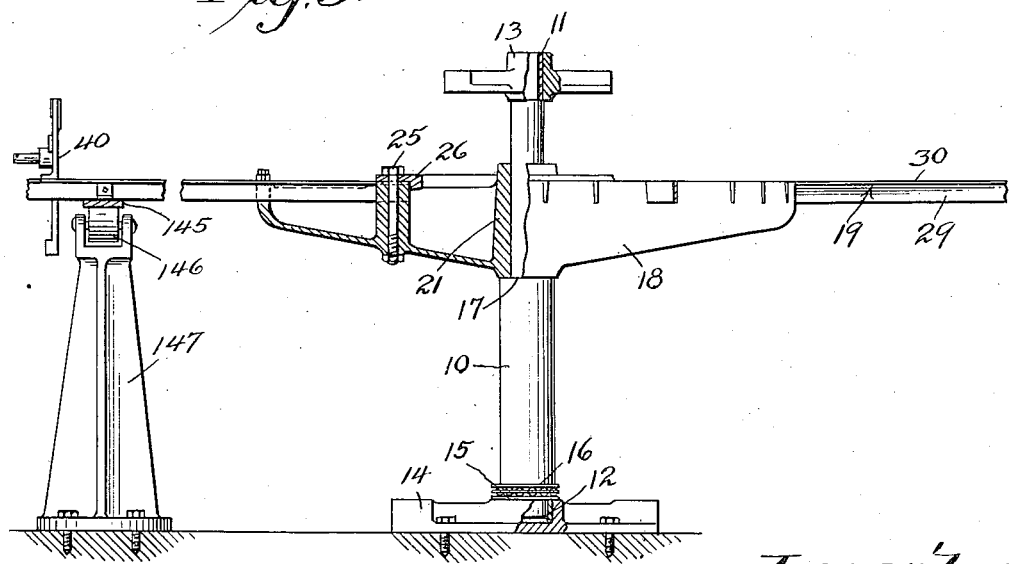
Fig. 3 is an elevation of the shaft and bowl.

The principal parts of the machine, which will be described in detail in the order mentioned, are, aside from the central stand and the supporting frame work: the molding mechanism carried by such revolving central stand, the batter feeding and the heating mechanisms each carried by the stationary framework, and the driving mechanism including the devices for transmitting intermittent motion to the central shaft carrying the molds in which the cones are baked.

The central shaft 10 revolves in bushings 11 and 12 in the top journal cap 13 and the base 14 respectively, and is supported on the latter by a thrust bearing 15 between the base and a shoulder 16 on the shaft 10. The upper section of the shaft 10 is materially reduced to a point about midway of the two journals, thus providing a shoulder 17 affording a substantial bearing for the central stand 18 which is a large casting generally of bowl or basin-shape and carrying on radially disposed T-irons 19 the annular series of molding and baking devices denoted as a whole by the numeral 20.

The central stand between its hub 21 and outer flange 22 is provided with an intermediate circular rib 23 of considerable strength which is pierced by equispaced holes 24 to receive the bolts 25 for holding in place the annular retaining ring 26. Between each of the radial strengthening ribs 27, the flange 22 and rib 23 are slotted as at 28 to receive the horizontal leg 29 of the T-iron 19, the flat web 30 of which lies flat against such flange and rib and is held in such position at its inner end by the ring 26 bolted to the central stand as stated.

These T-irons extend radially from the central stand and at their extremities support the outer heads 31 which are bolted to the T-irons by bolts 32 passing through lugs 33 and holding these heads, so that they present an unbroken annular wall about the central stand since the heads are finished on their adjacent sides 34 and are held in such position by the connecting plates 35.

A similar and concentric wall is presented by the corresponding inner heads 40 having outwardly extending lugs 41, similar to lugs 33, and receiving bolts 42 holding the heads in place on the radial irons 19. In addition, these inner heads are secured together by the plates 43 bolted to the upper corners of adjacent heads. Since the terms "inside" and "outside" in this specification refer always to the central shaft, it should be borne in mind that the outside of the inside head and the inside of the outside head are toward the molds 20, these molds sliding laterally on a shelf 44 of the inner head and a similar shelf 45 on the outer head, each mold section having a flat lug 46 at either end resting upon such shelf and being held against upward movement by ledges 47 and 48, respectively, corresponding in size with the shelves just beneath them.

The molds 20 are each formed of two similar sections which together provide a plurality of cone cavities 50, six in number in the preferred type, and a smooth upper face 51 over the entire width and length of the mold. The mold sections below the upper face conform as usual to the mold cavities and have the customary bottom stiffening rib 53 but differ from the ordinary type in having a pair of bearing faces 54 by which the sections are moved together by mechanism hereinafter described. At a point adjacent these faces 54 the sections each have four bosses 55 arranged in vertical pairs to receive the plates 56 by which the molds are opened.

The opening and closing device for the molds consists of a pair of cranks 60 pivoted at their inner ends in socket journals 61 in the head 40 and having trunnions 62 on their outer ends which pass through journals 63 on the outer heads and receive on that portion of the trunnion beyond the head 31, a crank arm 64 held in proper position thereon by a set screw 65. Links 66 connect the free ends of each pair of these arms 64 to a slide 67 having a roll 68 on a stud 69 at the lower end thereof, the central portion of such slide being positioned by vertical guidways 70 at the lower end of the head 31. The movement of roll 68 in cam groove 71 raises and lowers the slide 67 and consequently oscillates both the cranks 60, closing the molds on the upward stroke by the contact of the rounded ends 72 of the fingers 73 against the faces 54 of the mold sections forcing the latter together, and opening the molds on the downward movement of the slide by reason of the contact of the withdrawing pins 74 against the inner faces of the plates 56, thus bringing each of the sections nearer to the axis of its crank 60.

The cores 80 are secured to the heavy core holder 81 by screws 82 and have in addition to the usual cone an integral cylindrical disk 83 adapted to completely cover the mouth of the mold cavity 50. Secured to the downturned inner end 84 of the holder, received within the space 85 of the upper central portion of the head 40, is a slide 86 positioned by guideways 87 and 88 of the head and by the retaining plates 89 and 90, and carrying on a stud 91 at its lower end, a roll 92 resting on a cam face 93 which raises the heavy holder against gravity and strips the cores from the baked cones before the mold sections are opened, but as will be seen from the drawings, these cores are only slightly elevated so that should there be any tendency for the baked cones to stick to either half of the mold the core would loosen such cone therefrom.

The batter for the cones is prepared in mechanism not shown and is delivered to a tank 100 from which it is fed through a pipe 101 provided with a valve 102 which may be controlled by the driving mechanism if desired, to a receiving tray 103 of rectangular shape and leading to each of the delivery outlets 104 through a passageway 105 cored in the valve body 106, each of such passages being controlled by a valve stem 107 having a horizontal perforation 108 therethrough corresponding in size and shape with the passage 105. All of the valve stems of each set or block are connected together by an operating rod 109 by means of arms 110 fastened to the stems 107 and pivoted to the rod 109 so that when the rod is moved by a cam not shown all the valves of a set will be simultaneously opened or closed in such time as to deliver the desired amount of batter to each mold cavity 50.

The heating means supplies heat to the molds at each stop of the central stand, and preferably uses gas as a fuel as indicated by the drawings. Such gas is conveyed to the annular pipe 120 by a lead 121 from the main and is distributed from the pipe 120 to the radially disposed burners 122 so located that at each rest of the mechanism one of the molds 20 is directly above a burner 122. For the sake of clearness only a few of these burners are shown in the illustrations, but it will be understood that there are as many burners as there are molds. A simple form of burner is made from a piece of straight gas pipe capped at either end as at 123, and having a series of drilled holes 124 in its upper margin and each supported from the annular pipe 120 by a short centrally positioned lead 125. The flow of gas is controlled by valve 126 in the lead 121 and preferably is manually controlled on account of the simplicity of that form of device.

Power for operating the device is received from belt 130 driving the pulley 131 on shaft 132 which carries a small bevel gear 133 meshing with a larger gear 134 on a vertical cam follower shaft 135 carrying the drive members 136 and 137 for the Geneva wheel 138 on the drive shaft 139. A spur gear 140 on this shaft meshes with an annular rack carried by the set of outer heads 31 thereby giving an intermittent motion to all the mechanism carried by the central shaft 10. The baking devices are surrounded by a heat retaining casing as customary but this has been omitted for the sake of clearness in the drawings and as they are well known. In order to assist in carrying the weight of the revolving parts an annular ring 145 is preferably bolted to the T irons just inside the inner heads 40 and this ring bears upon four or more rollers 146 each mounted on a pedestal 147 as shown.

As soon as the cones are baked the six steel cone points rise about ¼ to ½ an inch, separating the cone which has been baked from the steel cone points, the rough printing or embossing on outer sills of the cone holding it against the pull of the point as it separates.

As soon as the points are raised ¼ to ½ inch, the mold slowly opens. The opening of the mold causes the cone to separate from the mold. Owing to the point being still in the center of the baked cone, although separate from it now, the cone breaks away from both sides of the mold at the same time. From this point on the mold opens slowly as the points rise.

What is claimed is:

1. In a cone making machine, a support, a plurality of cores thereon, a slide rigidly secured to said support at right angles thereto, a plurality of guideways for said slide, a roller pivotally mounted on said slide below said guideways, and means for engaging said roller to raise said support and cores.

2. In a cone making machine, a relatively heavy horizontally disposed support, a plurality of cores secured to said support with their points down, a slide rigidly secured to said support at right angles thereto, a plurality of guideways for said slide, a roller pivotally mounted on said vertically disposed slide near the bottom thereof, and means for engaging said roller to raise said support and cores against the force of gravity.

3. In a molding machine, a pair of slidably movable cooperating mold sections, a pair of cranks, a pair of fingers on each crank having rounded ends to engage said sections to force them into contact with each other, a pin on each finger and a separable retaining plate on each section of each mold, said fingers extending toward each other and at right angles to the meeting faces of the sections when the molds are closed.

4. In a molding machine, a pair of vertically disposed horizontally slidable cooperating mold sections, a pair of cranks mounted on opposite sides of said sections substantially central of their top and bottom faces, a plurality of straight fingers on each crank having slightly rounded ends to engage the body of each section to force them into contact with each other, said fingers, when the molds are closed, each pointing toward the axis of the opposite crank.

JOSEPH SHAPIRO.